US008892378B2

(12) United States Patent
Leal Diaz et al.

(10) Patent No.: US 8,892,378 B2
(45) Date of Patent: Nov. 18, 2014

(54) INTELLIGENT TOOL FOR DETECTING PERFORATIONS AND INTERPRETATION OF DATA ONLINE

(75) Inventors: Gonzalo Leal Diaz, Piedecuesta (CO); Juan Diego Ruiz Escobar, Piedecuesta (CO); Jorge Alberto Toscano Rodriguez, Piedecuesta (CO); Guillermo Latorre Cortes, Piedecuesta (CO)

(73) Assignee: ECOPETROL S.A. (CO)

( * ) Notice: Subject to any disclaimer, the term of this patent is extended or adjusted under 35 U.S.C. 154(b) by 558 days.

(21) Appl. No.: 13/139,216

(22) PCT Filed: Nov. 24, 2009

(86) PCT No.: PCT/IB2009/007640
§ 371 (c)(1),
(2), (4) Date: Aug. 19, 2011

(87) PCT Pub. No.: WO2010/067162
PCT Pub. Date: Jun. 17, 2010

(65) Prior Publication Data
US 2011/0301893 A1 Dec. 8, 2011

(30) Foreign Application Priority Data
Dec. 12, 2008 (CO) .................................. 08-132101

(51) Int. Cl.
*G06F 19/00* (2011.01)
*G01M 3/00* (2006.01)
*G01M 3/24* (2006.01)
*H01H 19/11* (2006.01)
*F16L 55/128* (2006.01)
*H01H 3/50* (2006.01)
*F16L 101/70* (2006.01)

(52) U.S. Cl.
CPC .............. *G01M 3/005* (2013.01); *G01M 3/246* (2013.01); *H01H 19/11* (2013.01); *F16L 55/1283* (2013.01); *H01H 2003/506* (2013.01); *F16L 2101/70* (2013.01)
USPC .............. 702/65; 285/24; 73/865.8; 324/220; 365/228

(58) Field of Classification Search
CPC ... G01M 3/005; G01M 3/246; F16L 55/1283; F16L 2101/70; H01H 19/11; H01H 5/02; H01H 2003/506
USPC .............. 702/65; 73/865.8; 324/220; 365/228
See application file for complete search history.

(56) References Cited

U.S. PATENT DOCUMENTS
4,123,700 A * 10/1978 LaConti et al. ............... 324/425
4,153,875 A   5/1979 Pigeon et al.
(Continued)

FOREIGN PATENT DOCUMENTS
CA   2 085 048       4/2003
CN   1696713 A   * 11/2005
(Continued)

OTHER PUBLICATIONS
International Search Report for International Application No. PCT/IB2009/007640 mailed Mar. 12, 2010 (Form PCT/ISA/210).

*Primary Examiner* — Carol S Tsai
(74) *Attorney, Agent, or Firm* — Merchant & Gould P.C.

(57) ABSTRACT

The present application relates to a tool for detecting perforations in hydrocarbon pipelines based on the sensing system thereof. The function of said tool is to pass longitudinally through a pipeline of specific diameter, monitoring the thickness thereof and detecting any hole over the path followed and, in accordance with the data obtained, establishing the distance at which the holes are located, calculated from the starting point, the time at the instant of detection and also the circumferential position and size thereof, all the aforesaid as part of an online process implemented as the tool progresses through the target pipeline. At the end of the run, the information may be downloaded to a computer where it is available for use and for the corresponding decisions concerning integrity.

37 Claims, 10 Drawing Sheets

(56) References Cited

U.S. PATENT DOCUMENTS

| | | | |
|---|---|---|---|
| 4,769,598 A | 9/1988 | Krieg et al. | |
| 5,173,652 A * | 12/1992 | Henkel | 320/104 |
| 5,864,232 A | 1/1999 | Laursen | |
| 5,959,857 A * | 9/1999 | Nagahara | 363/132 |
| 6,023,986 A | 2/2000 | Smith et al. | |
| 6,100,684 A | 8/2000 | Ramaut | |
| 6,606,916 B2 * | 8/2003 | Bignell et al. | 73/861.27 |
| 6,640,655 B1 | 11/2003 | Manzak et al. | |
| 7,065,593 B2 * | 6/2006 | Ripy et al. | 710/100 |
| 7,457,592 B2 * | 11/2008 | Arayashiki | 455/108 |
| 7,469,600 B2 * | 12/2008 | Matt et al. | 73/861.356 |
| 7,472,611 B2 * | 1/2009 | Hanazawa et al. | 73/862.626 |
| 8,384,538 B2 * | 2/2013 | Breed | 340/500 |
| 2002/0011124 A1 | 1/2002 | Phipps | |
| 2005/0241710 A1 * | 11/2005 | Early et al. | 138/89 |
| 2007/0023878 A1 * | 2/2007 | Burton | 257/675 |
| 2008/0149548 A1 * | 6/2008 | White | 210/222 |
| 2009/0278638 A1 * | 11/2009 | Giroud et al. | 335/205 |

FOREIGN PATENT DOCUMENTS

| | | | |
|---|---|---|---|
| DE | 2222034 B | * | 12/1976 |
| GB | 2 376 077 | | 12/2002 |

\* cited by examiner

INTELLIGENT TOOL FOR DETECTING PERFORATIONS AND INTERPRETATION OF DATA ONLINE

This application is a National Stage Application of PCT/IB2009/007640, filed 24 Nov. 2009, which claims benefit of Ser. No. 08-132101, filed 12 Dec. 2008 in Colombia and which applications are incorporated herein by reference. To the extent appropriate, a claim of priority is made to each of the above disclosed applications.

TECHNOLOGICAL SECTOR

The present application is related to a tool for detecting perforations on hydrocarbon pipelines based on its sensing system. The function of this tool is to longitudinally pass through a pipe of a specific diameter, monitoring its thickness and detecting any hole that is found on the trajectory and, according to the obtained data, establish the distance at which the holes are found, calculated from the starting point, the time at the moment of the detection, as well as its circumferential position and its size, all the above in an online process that is developed as the tool travels through the target pipeline. At the end of the run, the information can be downloaded to a computer where it is available to be used and make the corresponding decisions concerning integrity. The displacement of the tool is exerted by the flux inside the pipeline, which is a characteristic of the commonly used pigs for the pipelines cleaning.

INVENTION BACKGROUND

In the state of the technique exist numerous tools for the cleaning or physical separation between different liquids that are transported in pipes; another type of tool is oriented to the maintenance and inspection of the internal and external conditions of the hydrocarbon or gas pipelines, that allow to capture and record geometrical information of the pipe, such as size, position and internal and external defects, among others.

Among the inspection tools there are the online inspection tools, which internally travels inside the pipe due to the dynamic of the fluid it transports, owing to this, it is not required to suspend the normal operation of the pipeline to comply with the objective of inspecting the pipe.

The intelligent tools employ different inspection methods. The inspection methods mostly used to detect various aspects of the pipe are: Magnetic flux leakage (MFL) and Ultrasound (UT). The intelligent tools, specially those that employ MFL technology, are the most employed and have been developed in greater number, to the point that there exist a great quantity of patent applications related to tools based on this principle.

Among the documents related with this type of tools it can be found the U.S. Pat. No. 4,153,875, which refers to a testing device through the current for metal tubes that are bended, at least locally. The device operates due to the translational movement of a probe inside the tubes, the probe is equipped with coils that serves as emitter—receptor and with an electrical cable that has connected conductors to the probe and are mechanically coupled to the probe to do the translational movements that continually emerge from the posterior end of the tube and that remains connected to a supply system and exploration of the tube system that are found outside of it. This apparatus has a diversity of modules, where there can be found the one for feed, of detection and the one for storage. However, the described tool on this application does not allow an easy manoeuvrability inside the pipe, given that it doesn't have homokinetic joints and the control of the information received by the sensors is controlled only through an electronic media.

Additionally, it can be found the U.S. Pat. No. 5,864,232 that describes an intelligent tool to analyze anomalies that can be found on the walls of a pipe. This tool presents a cylindrical body that has a feed module, a data storage module, means to generate and transmit a magnetic field; means to read magnetic flux leaks caused by anomalies on such pipe and a plurality of wheels joined to the tools' body, which allow the device to slide through the pipe. Also, the tool on this document present several wheels, only useful for the displacement, and a media to propel the tool through the pipe, which is not recommended, as a much higher energy consumption is had due to the drive module that allows the tool to displace through the pipe.

Moreover, there is the U.S. Pat. No. 6,023,986, which refers to a defects localization system of a pipe that comprises an internal navigation system (INS) and a Global Positioning System (GPS). In particular, this application refers to the method to perform the inspection of the pipe and it does no limits to a sole tool for detection, which leaves an open field regarding the device that can be used inside the pipe. Such tool is too complex and its power consumption is elevated, due to the great quantity of additional modules with which it counts to carry out the defects detection in the pipe. Also, this tool needs specialized personnel to perform the maintenance, operation and interpretation of the data, due to its complexity in operation due to the GPS and INS modules.

In addition, the U.S. Pat. No. 6,100,684 divulges a system to detect cracks and thickness variations on the pipes walls, specially a detection method using such system. This system comprises: media to generate and inject a magnetic flux on a portion of the pipe, media to measure the local magnetic fields on the inside surface of the pipe, media to process, store and localize such measurements, and media for the drive of such system through the fluid flow in the pipe. Such system presents a disadvantage in the area of pipes detection and monitoring, which is based in the inability to turn when deviations or turns are found in the pipe, because when the turn is too close the tool would be wedged there. Also, the system counts with various driving modules that slide and drag the tool.

In addition to the documents mentioned previously, we found the application U.S. Pat. No. 6,640,655 that refers to an intelligent tool that has a driving module, a magnetizing section and a storage and record of data section. Inside the magnetizing section there is a plurality of sensors that detect the different defects that can be presented on the wall of the analyzed pipe. The driving module is in charge of pulling the tool through the pipe. The tool counts with a suspension system that allows determining the thickness of the pipe and thus knowing if deterioration exists.

On the other side, the document nearest in the state of the art to the present invention is the patent application US 2002/0011124, which defines an intelligent tool for the detection of defects that can be found in a pipe, specially to determine the wall thickness of it. This tool is comprised basically by three electronic modules, which are a sensing module, a feed of power module and a data storage module. This tool uses the ultrasound for the detection of defects. The main disadvantage of this tool is that it can only be used for relatively straight pipes, given that its connexion system between modules doesn't allow it to turn easily, which restricts its operation. Also, the described invention on such document doesn't present a plurality of Hall effect sensors nor the cards in charge of them, so it doesn't use a personalized system for groups of sensors and therefore it is not obtained a better information control and a greater precision of the defects that can be presented in a pipe.

The online inspection of pipes present two main problems. The first of these is the obstacles in the pipe as dents, obstructions or geometric restrictions, such as curves or valves that obstruct the displacement of conventional tools, which prevents the coverage of the total length of the pipe. According to the exposed, the tools present inconveniences, given that they don't collect all the data related with these particular sections of the pipe and as a result, the operators obtain an incomplete image or information regarding the state of the pipe. These zones generally can contain potential failures or defects and also, require priority maintenance to ensure the normal operation of the pipe.

Given this, the obtaining of more effective tools to avoid pipe restrictions as the previously mentioned, has been of concern during the last years. Some of these inventions that try to overcome these inconveniences are divulged next.

In this sense we find the U.S. Pat. No. 4,769,598, which refers to an apparatus and method to evaluate in an electromagnetic manner, the walls of the pipe. This invention basically counts with two modules that have some carriers or displacement media that allow the tool to slide through the pipe in an easy and save manner. One of the modules of this tool generates an electromagnetic field that allows the determination of existing defects on the wall of the pipe, that are read by magnetic sensors.

This document presents a disadvantage, which is that in each of the modules comprise at least four rollers or wheels to allow the tool to slide and they only comply that function without allowing such wheels to comply another different function. In addition, the tool described in this document does not count with control and positioning systems, given that it doesn't have multiplexing cards or a control card that supervises the others through an interruption mode sent to the microcontrollers of such cards. Also, given that it doesn't count with these cards, it is not possible to control all the time the received information by the sensors and there's no appropriate communication with the computer for the interpretation of the data by the user.

It exists another problem in the online inspection and is found basically constituted by the interpretation of the information of the obtained data. The way of doing the interpretation of the stored data on the existing tools is the post-inspection interpretation, which leads to the interpretation of the stored data through signal treatment software, through neuronal nets and algorithms that make it a difficult, wasteful and delayed process that normally requires validation and interpretation from an expert. In addition, it must be added that the process requires of high capacity elements and of robust architecture for the storage and processing of the information.

The proposed method on the present invention is the online interpretation, which consists in the analysis of the information taken on the sensing process from the tool and in real time. This way of interpretation offers a robust and versatile tool for all type of users and also, allows the decrease in the number and size of the storage devices that are found on this tool.

SUMMARY OF THE INVENTION

The tool for the detection of perforations, object of this invention, is found immersed in a system that consist of two big blocks: one of acquisition, interpretation and storage of data and another of information decoding and visualization of these data. The data acquisition, interpretation and storage block is the basic element in the tool for the internal inspection of pipes. This inspection is done principally through magnetic sensors (Hall Effect) and the obtained data is processed and interpreted by means of internal algorithms, which allow to acquire, process, interpret and store in real time all the information that corresponds to the typical characteristics of a found perforation.

The second block of information decoding and data visualization consist of a computer software that is in charge of receiving the stored information in the tool, decoding it and represent it on a graphic interface that is understandable and manageable for the user of the system, without the need of expert validation.

The data acquisition, interpretation and storage block in the tool for the detection of perforations is constituted physically by three principal modules: battery module (1), positioning and main control module (2) and the magnetic sensing module (3). Optionally, the tool counts with two secondary sensing modules that would be placed on the magnetic sensing module (3). Such additional modules can or can't be used depending on the need and are defined as ultrasound modules and vision module, they allow to ratify the information found by the magnetic sensing module (3), which object is to provide redundant information.

Due to the action of the different types of sensing that contains the tool, is possible to detect any existing defect in the pipe, among them internal and external wear, which allows the tool being adequate to diagnose the total integrity of a hydrocarbon pipeline, having into account that in this case its principal objective is of storing only the information corresponding to perforations.

BRIEF DESCRIPTION OF THE FIGURES

The invention can be understood in a better way through the figures, where there are shown each of the elements that compose the intelligent tool for the detection of perforations and interpretation of online data. Also, the figures show the reference numbers assigned to the corresponding parts of the mentioned device.

DETAILED DESCRIPTION OF THE INVENTION

Figure 1:
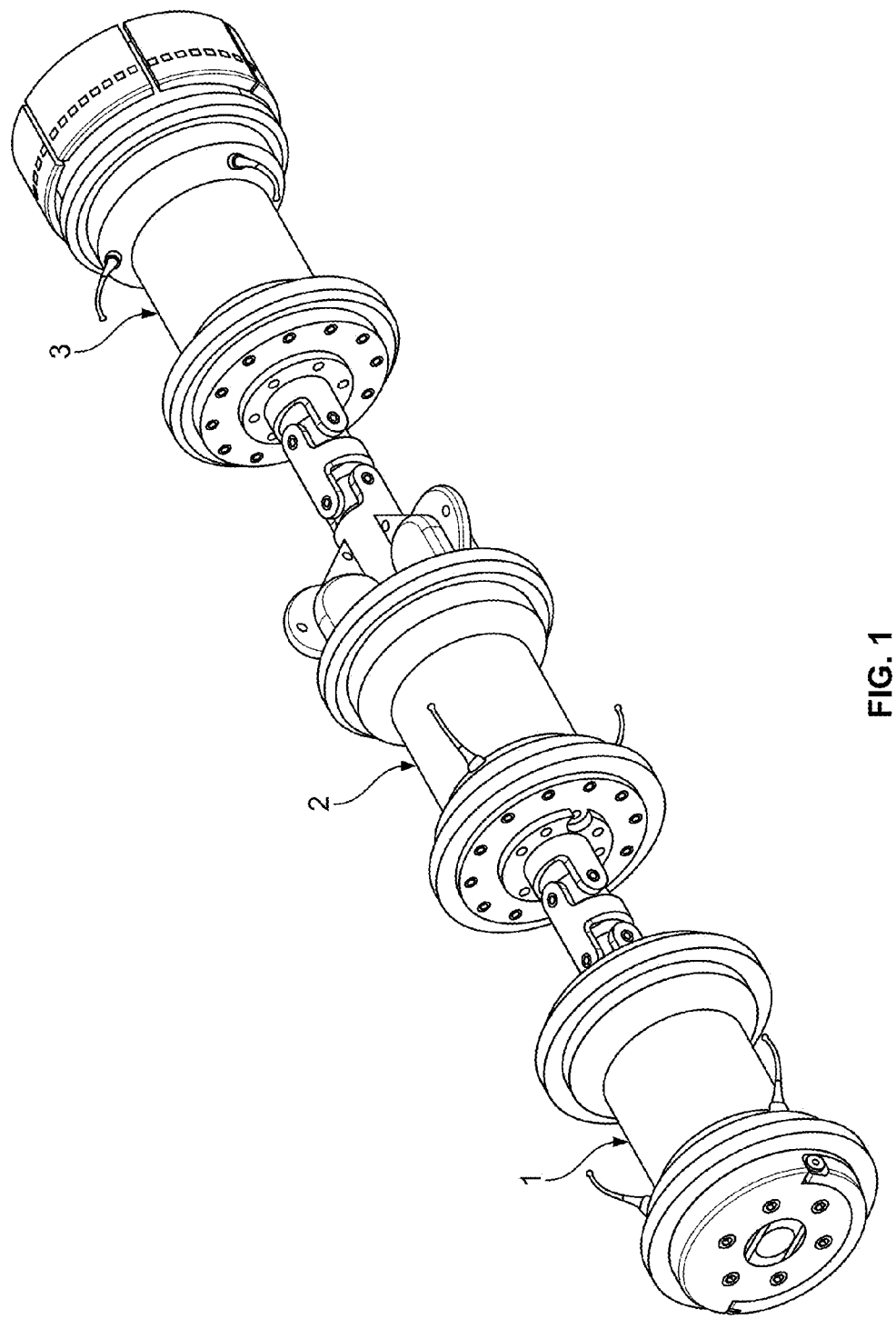
FIG. 1: This figure corresponds to a general scheme of the detection tool.

FIG. 1 shows a tool for the detection of perforations and interpretations of online data, which is composed of three modules defined as battery module (1), positioning and main control module (2), and magnetic sensing modules (3). And each one of these modules is composed by a series of elements that allow their operation and provides with novelty to the present invention.

Figure 2:
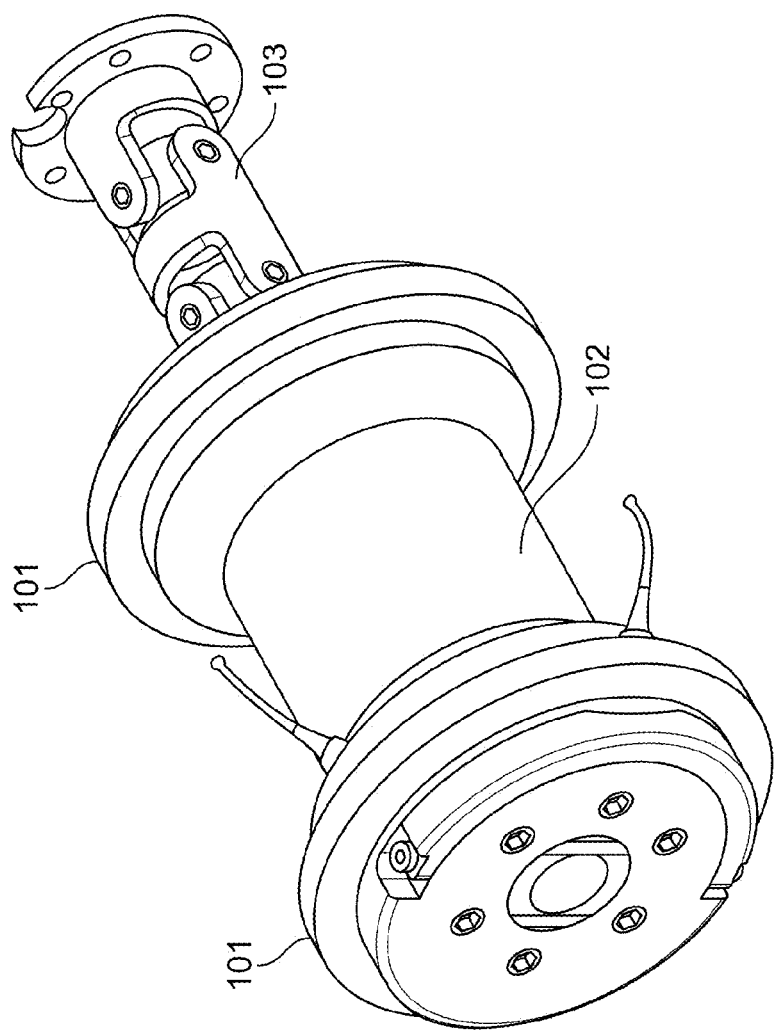
FIG. 2: This figure corresponds to a blueprint of the battery module (1).
Figure 3:
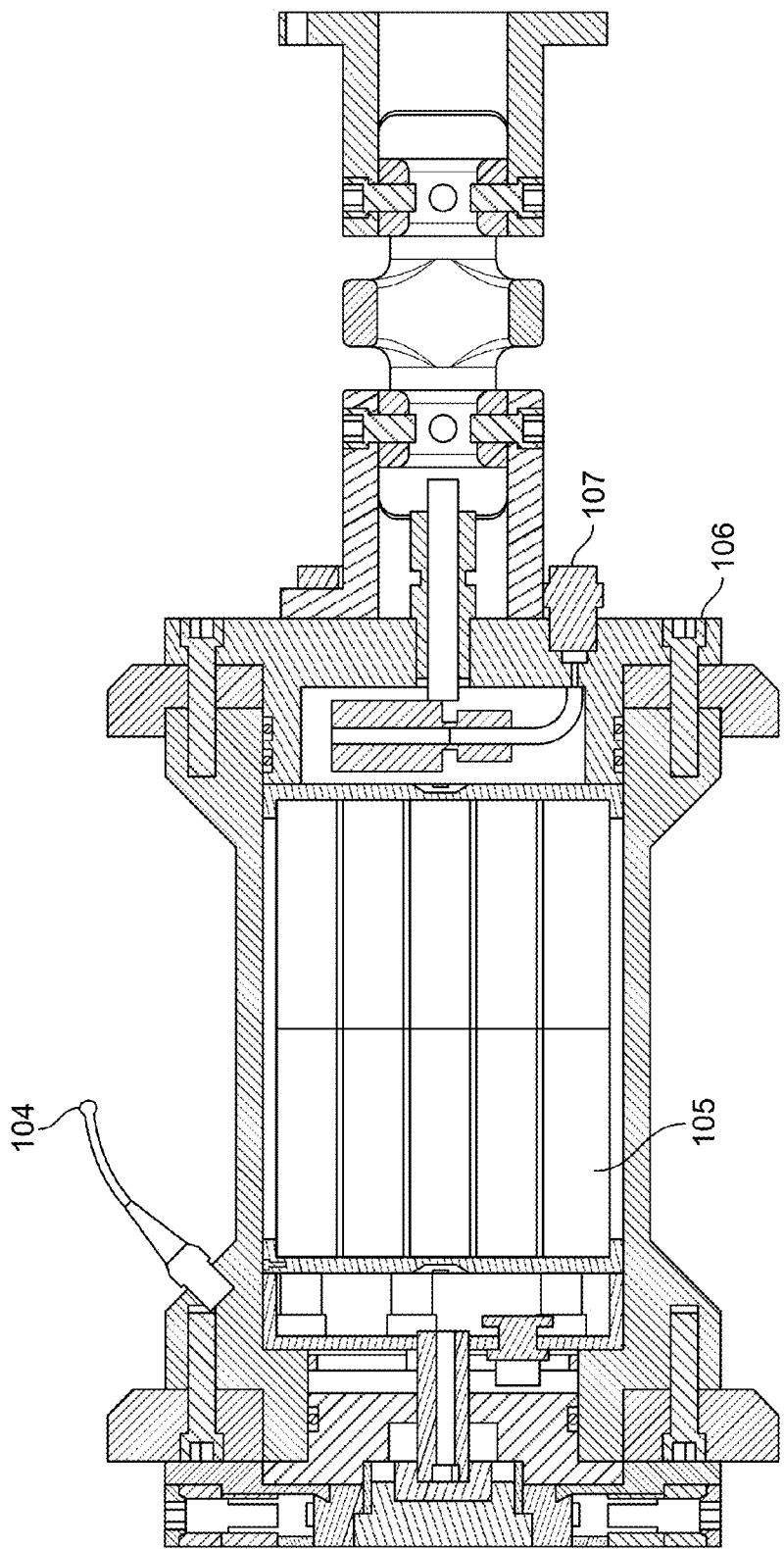
FIG. 3: This figure corresponds to a transversal cut view of the battery module (1) of FIG. 2.

The battery module (1) is shown on FIGS. 2 and 3, and is in charge of supplying and maintaining the energy of the whole tool. Also, it has the function of regulating all the voltages needed by each of the elements located on the other modules. This battery module (1) as an internal wiring located in the same module connecting the batteries (105), an exterior connector (106), which aim is to allow the charge of the battery when needed.

The mentioned battery module (1) is conditioned with different capacitor filters that can be between 1 mF and 100 mF, with the end of reducing to the maximum the noise that can generate the card regulation stage.

The battery module (1) counts basically with a plurality of batteries (105), which have specifications between 2,500 mA/h and 5,000 mA/h and a voltage between 1.2 v and 5 v, to create a total package between 9.5v and 12v and a current between 18,000 mA/h and 22,000 mA/h, according to the power specifications required by the sensors, microcontrollers, memories and different electronic elements, with the end of supplying enough charge to the tool and accomplish its adequate functioning, having into account the distances that must be travelled.

Physically, the external structure of each of the modules (1, 2 and 3) is the same. They are constituted by two support discs (101, 209 and 309) and a metallic body (102, 210 and 310). The discs (101, 209 and 309) are in charge of maintaining the tools stability inside the pipe, given that during the entire trajectory they are completely glued and adjusted against the internal wall of it. For that reason, these discs (101, 209 and 309) must be built on a strong material resistant to friction, high pressure and the chemical nature of the fluid, preferably polyurethane or polypropylene.

The body (102, 201 and 310) of the module is a hollow metallic tube, in charge of giving rigidity. Preferably, the body has a wall thickness that resist an external pressure up to 15 MPa. The battery module (1) as well as the other modules (2, 3), count with three external ground contacts (104, 208, 308), which are in charge of landing the tool during the travel and eliminate all possible energy or static charge that they can acquire.

In the inside of the body of the battery module (1) it is a battery package (105). Also, it is interconnected with the positioning and main control modules (2) through a homokinetic joint (103, 211), that gives flexibility to the system, allowing the tool to sort out curves in pipes up to 3 diameters of radius. All the communication and feed wiring that travels the totality of the tool passes though these joints.

Figure 4:
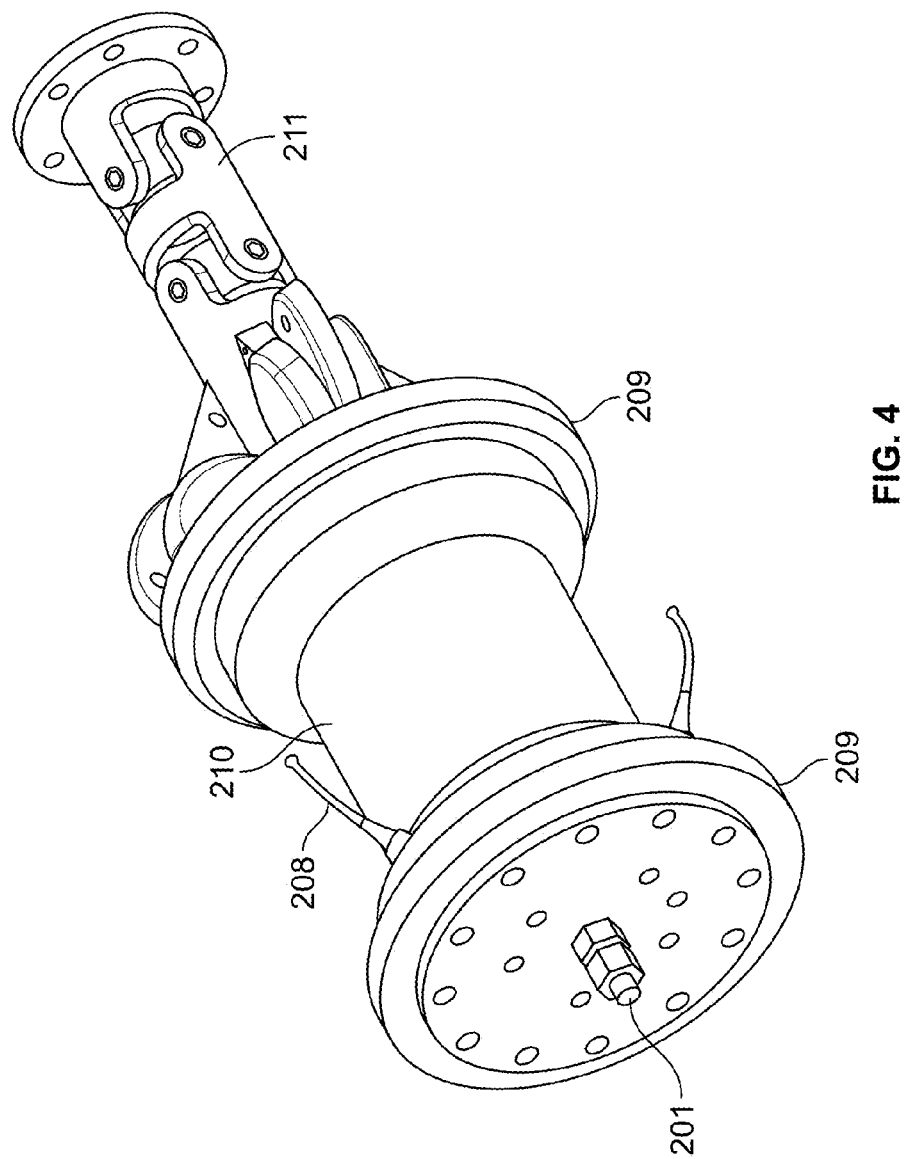
FIG. 4: This figure corresponds to a plane of the positioning and principal control module (2).
Figure 5:
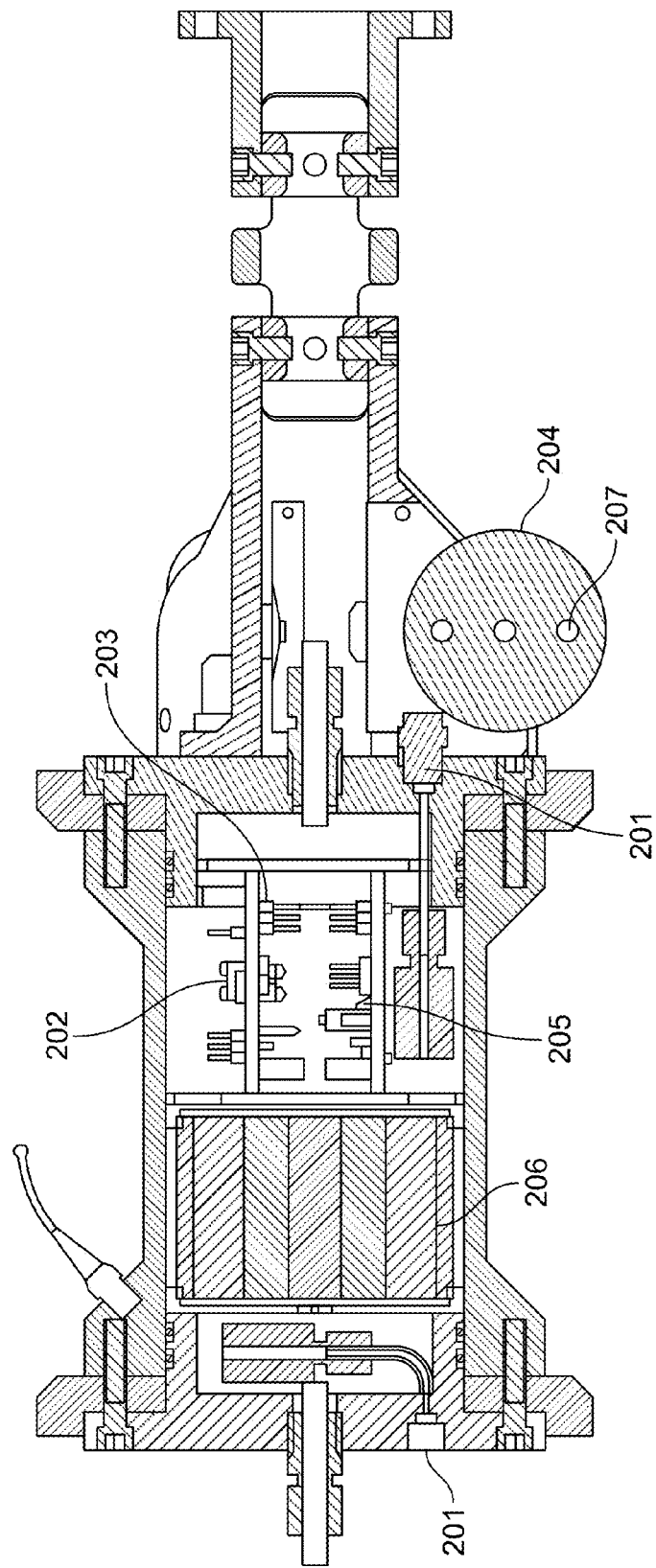
FIG. 5: This figure corresponds to a transversal cut view of the positioning and principal control module (2) of FIG. 4.

The positioning and principal control module (2), shown in FIGS. 4 and 5, is divided in two sections according to the functions it fulfills, which consist on obtaining the positioning data of the tool and of supporting the main controller.

Two essential actions take place in the positioning section. The first is measuring with three odometers the travelled distance in the pipe, from the starting moment until the moment the travel ends, in order to have the distance at which all the found perforations are located. The odometry card (203) is the one in charge of managing this information on the positioning and main control module (2). Each one of the three odometers is constituted by a wheel (204) that must be in contact with the pipes internal wall during all the trajectory, so it must be constructed on a wear resistant material but with a high friction coefficient, given that it cannot slide at any moment because it would generate errors on the distance measurement. According to this information, the wheel (204) can be constructed in Teflon, Viton, polyurethane or mixtures of these. In addition, the wheel (204) has two embedded magnets (207) located on opposite sides of the same face. These magnets (207) allow to generate the counting of turns that the wheel (204) does to obtain the value of the distance through the Hall effect sensors.

The other function of the positioning and main control module (2) is to measure the angular position of each perforation or defects that is detected on the transversal section of the pipe. For this, there are used two accelerometers located on the odometry card (203), which generate a different voltage value for each position on the XY plane in which the tool is found. Afterwards, these values are processed by an algorithm that finally indicates the angular location of the perforation or defect that is found on the circumference of the pipe. All this information is sent to a microcontroller located in the position card (202). This position card (202) counts also with a real time clock that allows taking the exact moment (time) of the detection of the perforations or defects. The data of the accelerometers and the real time clock are sent through the microcontroller towards the main control card (205) in the moment at which it requires it.

Lastly, this positioning and main control module (2) has an internal wiring that contains the polarization and the serial communication threads, through which all data will be transmitted to the main controller, apart from an extra battery package (206), which complements the energy supplied by the battery modules (1).

In the main controller section it is found the control card (205). This control card (205) is in charge of receiving all data from the tools peripherals, with the purpose of organizing and coding it for their later storage on the memories, preferably on EEPROM, RAM, Cache, FLASH or ROM, through the I²C communication protocol.

Things like this, the memories are in charge of storing and maintaining the information of perforations or defects found on the trajectory, so once all the course has finished this information can be downloaded and visualized on an external visualization media, such as a computer, PDA's personal assistants, cell phones and similar.

The modules (1, 2 and 3) count with input and output valves (107, 201 and 311) to inject or evacuate nitrogen or some inert gas that displaces the air inside the module, to create an inert environment and that presents a greater security condition in the tool.

Figure 6:
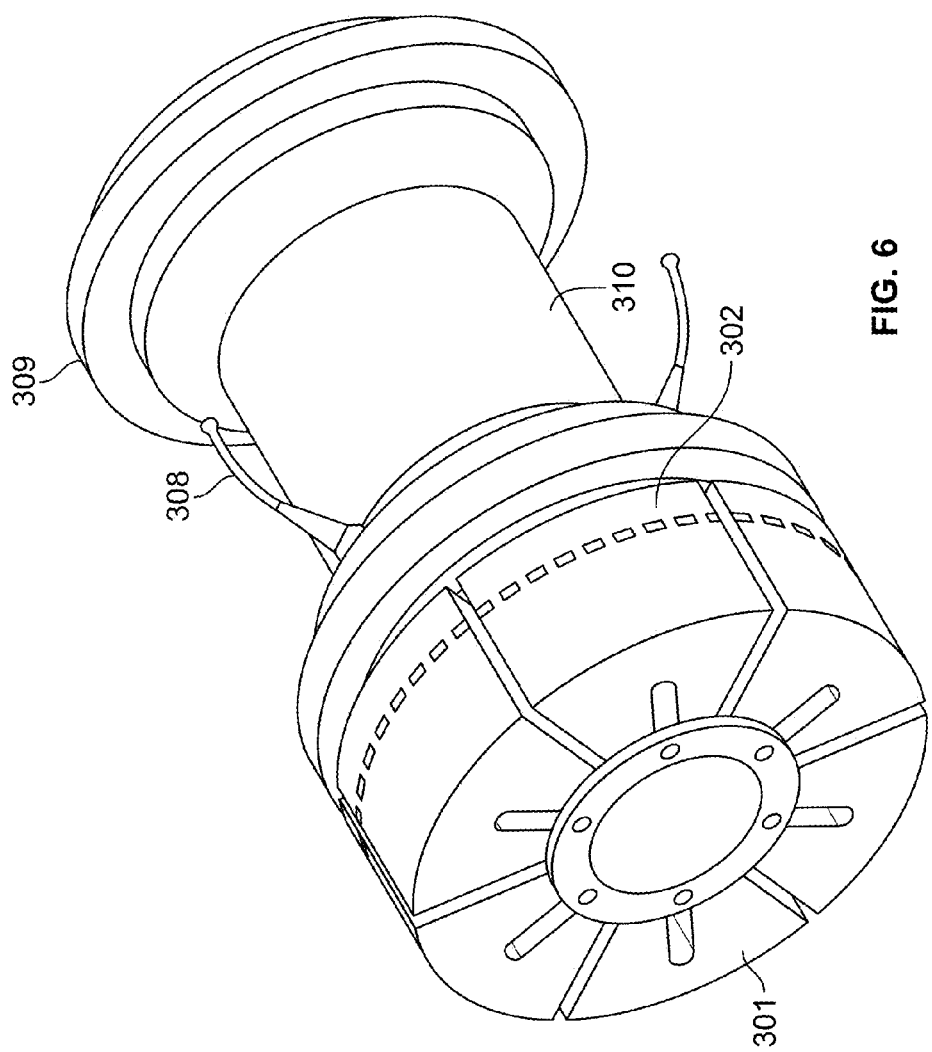
FIG. 6: This figure corresponds to a plane of the magnetic sensing module (3).
Figure 7:
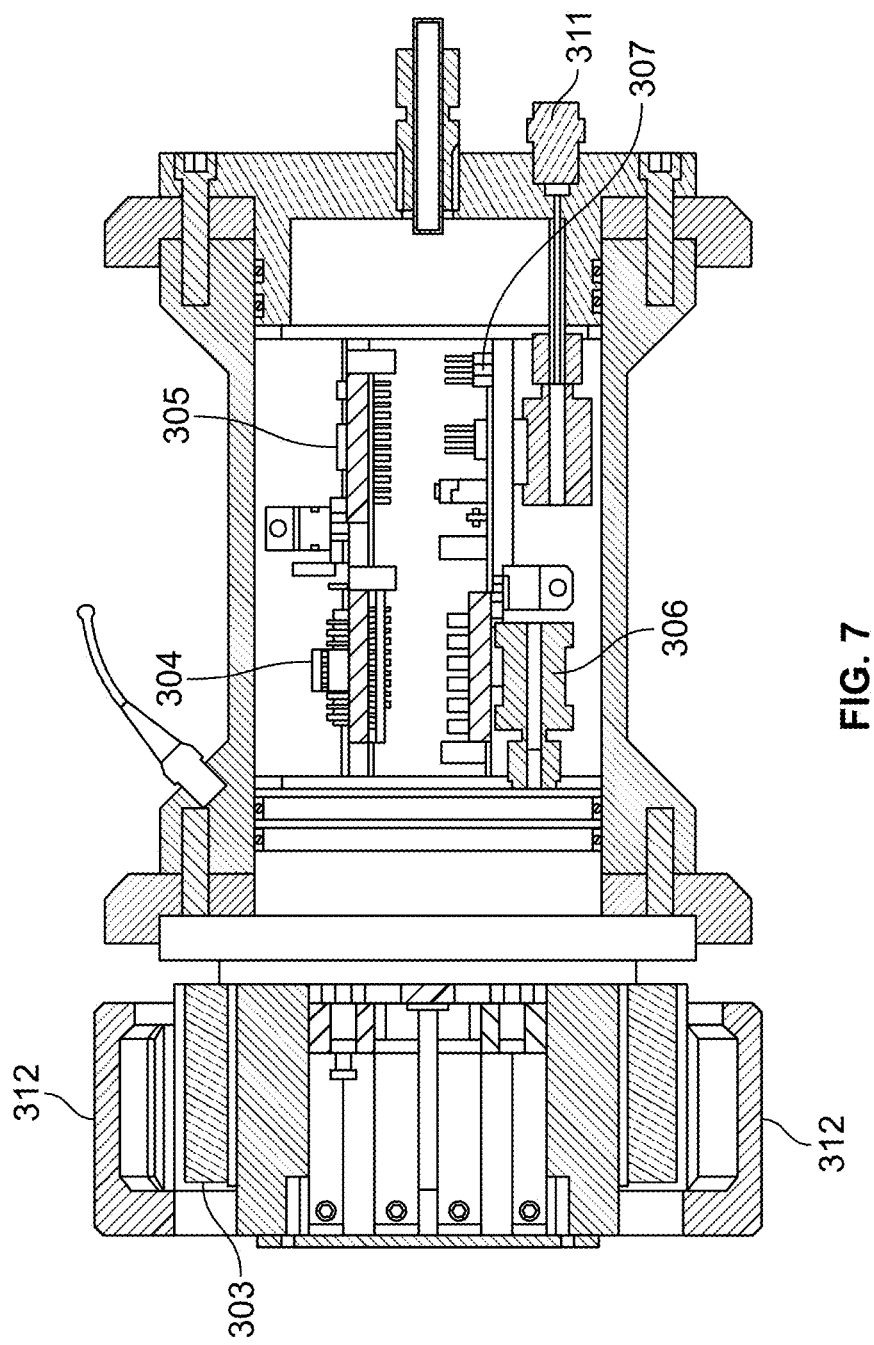
FIG. 7: This figure corresponds to a transversal cut view of the magnetic sensing module (3).
Figure 8:
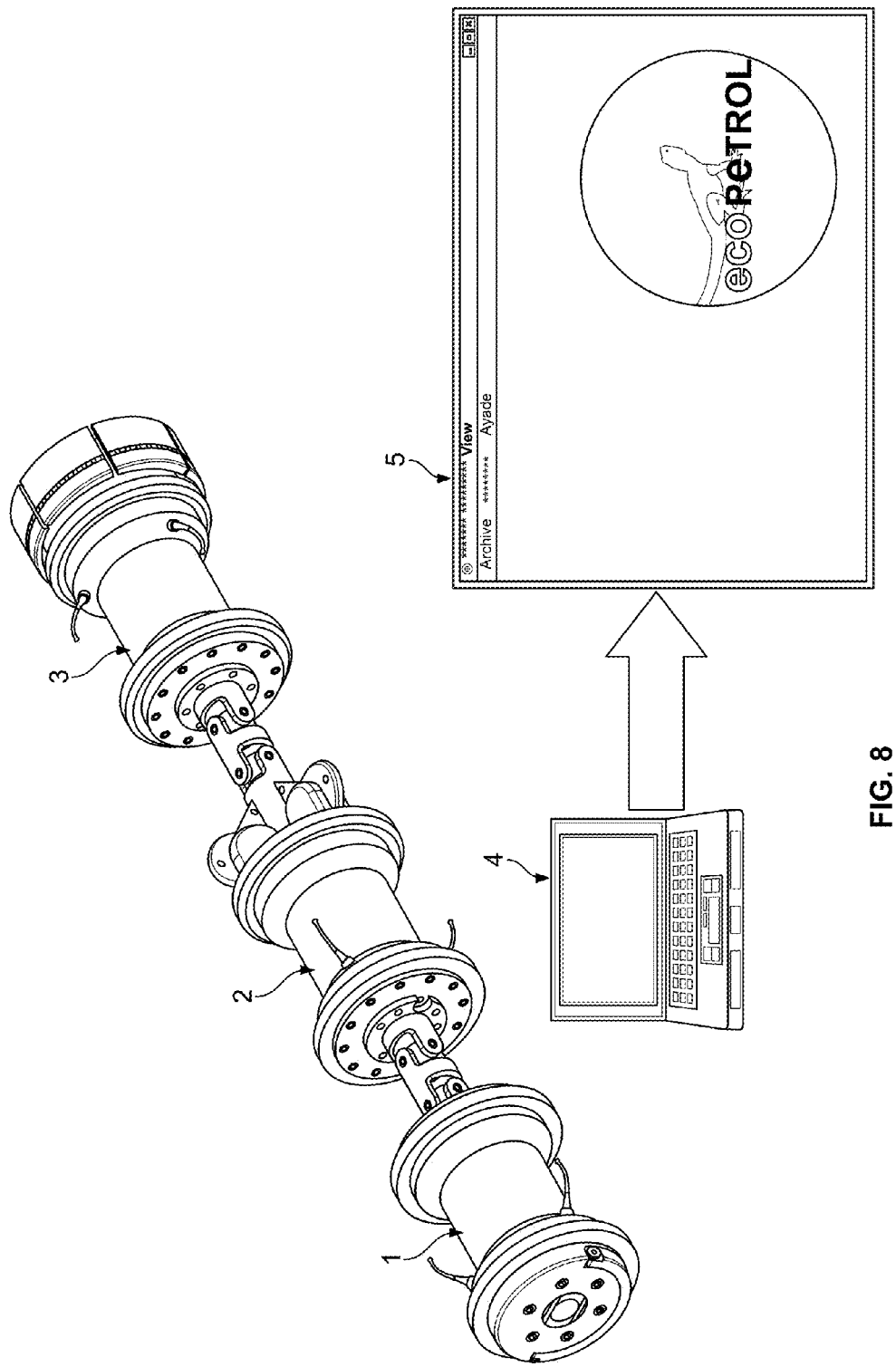
FIG. 8: This figure corresponds to a general and conceptual acquisition, storage and information visualization design.

The Magnetic sensing module (3) on FIGS. 6 and 7, is in charge of detecting the perforations and defects in the pipe. So, when a perforation or defect exists, the metal loss is maximum on this section of the pipe and the most used method to measure these losses is MFL. This tool uses the MFL method with a variation on the disposition between the magnetic field and the sensors, which is not currently used by any tools that are found on the state of the technique.

Usually, in the MFL method the pipes walls are magnetized and the sensors take measurements of the magnetic field variations that can be generated in them. Different to this, the tool of the present invention works with a configuration in the sensing system, in which the elements in charge of generating the magnetic field to magnetize the walls of the pipe are not in direct contact with these. Such elements in charge of generating the magnetic field are permanent magnets (303) radially located on the body of the module, sensing crown (312) in such way that the north pole of each of them is confronted with the posterior face from the Hall effect sensors (302). These Hall effect sensors (302) are located radially at a distance between 1 and 3 millimeters from the internal wall of the pipe. The variations in the magnetic field are represented in variations of the output voltage of the sensors, allowing to detect the perforations or existing defects.

The magnets (303) used on the magnetic sensing module (3) can be ceramic, of alnico or rare earths, preferably from the latter, with a field density of 100 mWb to 200 mWb (10,000 and 20,000 Gauss). The rare earths magnets can be selected from a group consisting of Samarium, Cobalt, Boron or Neodymium, although it's advisable to use Neodymium ones due to their magnetic characteristics.

The sensing crown (312) of this module (3) is composed by six crown sections (301), in which the tools Hall effect sensors are located, preferably in a quantity of 30 to 70 sensors, more preferably between 40 and 60. This crown sections (301) are in contact with the pipes internal walls during the entire trajectory, so the material in which they are constructed must be strong and wear resistant, preferably polyurethane, polypropylene or mixtures of these.

On a preferred mode, this module (3) is constituted by four cards. Three of them are in charge of managing the Hall effect sensors (302) information in groups of equal quantity each. For the cases were there are 48 Hall effect sensors (302), each card is in charge of 16 of these sensors.

The module (3) comprises four electronic cards that are configured on a master—slave scheme. Three multiplexing cards (304, 305 and 306) act in slave function, executing the algorithms that allow knowing in real time the information that is really important. The card that acts as master is a fourth commutation and multiplexing card (307), which is in charge of controlling and syncing the multiplexing cards (304, 305 and 306) mentioned before.

The multiplexing card 1 (304) is in charge of obtaining and interpreting the data coming from sensors 1 to 16. To achieve this, the card counts with a microcontroller, which is the intelligent part of the card and is in charge of obtaining the information from the sensors, analyze it and interpret it in real time. This microcontroller must be of 8, 16 or more bits, and must have a data memory of no less than 256×8 bytes. Also, this must have a serial transmission module, an analogue/digital convertor and an ICSP (In-Circuit) programming capacity.

To control the passage of data from the sensors to the microcontroller, it is used an analogue multiplexer and a signal conditioner (CAS) must be located between the output of the multiplexer and the input of the microcontroller, with the aim of locating the important information interval provided by the Hall effect sensors (302) and eliminating the non relevant information. The described configuration improves sensibility and increases the interpretation speed.

Also, the multiplexer card 1 (304) counts with double voltage regulation, given that the working limits of the integrated circuits are different to the limits of the sensors integrating RC filters to the system to minimize the noise that can enter, which causes errors on the measurements.

On the other side, the multiplexer card 2 (305) is in charge of obtaining and interpreting the data coming from sensors 17 to 32. The configuration of this card is similar to the configuration described for the multiplexer card 1 (304), taking into account the parameters previously defined.

In the same way, the multiplexer card 3 (306) is configured in a similar way to the other two multiplexer cards (304 and 305) with the difference that this is in charge of obtaining and interpreting the data coming form sensors 33 to 48.

The commutation and multiplexer card (307) is the link between the multiplexer cards (304, 305 and 306) and is in charge of obtaining, analyzing and filtering in real time the useful information and the data needed so that at the indicated moment such data is sent to the main control. This work is done through the programmed algorithms in the microcontroller in the commutation and multiplexer card (307). This microcontroller has to be of the same characteristics than that of the microcontroller defined for the multiplexer cards (304, 305 and 306), with the purpose of having synchronization in the communication between the cards.

On the other side, the control card (205) that is found in the positioning and main control module (2), is in charge of managing the operation and communication protocol with all the other cards of the tool. Also, such control card (205) supervises any event that happens, meaning, is in charge of the detection of some perforation, welding, wear or other internal defect that can be present in the pipe.

This control card (205) is also in charge of storing all the important information obtained from the inspection performed and does the connexion with the visualization media (4) when the transmission of the processed data is done and stored in the memories.

Likewise, the control card (205) has a microcontroller of similar characteristics to the previous cards, but additionally has the information storage memories. Given that the tool performs the acquisition, analysis, interpretation and filtering of the information online, it is not necessary to condition it with memories of great capacity, but different types of memories can be used, preferably EEPROM, RAM, FLASH or ROM, that have a capacity between 128 and 2048 Kbits, preferably between 256 and 1024 Kbits.

In addition, the position card (202) is in charge of obtaining the information of the angular position and time (Hours, minutes and seconds) in the section of the pipe where a perforation or defect is detected. For this, the position card (202) counts with an intelligent part, which consists of a microcontroller with the same characteristics from the ones on the cards described previously.

Also, this card counts with two accelerometers, in charge of generating the XY coordinates in which the tool is found at all time during the inspection and detection process. This information enters to the microcontroller as a difference in voltage, that, through a previously programmed algorithm, it transforms it into angular position to be sent to the control card (205). The position card (202) also counts with a real time clock directly connected to the microcontroller. This clock is in charge of continually sending the elapsed time during the inspection performed along the target pipe. The position and time data would only be stored at the moment that the control card (205) indicates it.

Likewise, the positioning and principal control module (2) counts with an odometry card (203), which is in charge of carrying the information of the distance travelled by the tool inside the pipe. Such card comprises a microcontroller with characteristics similar to the ones of the cards previously described, taking into account that this must have at least three analogue/digital convertors, given that through these terminals is the input of the information from the Hall effect sensors located on the support of the wheel (204) of each of the three odometers. The same as with the previous cards, the information of the travelled distance would only be stored when the control card (205) indicates it.

Additional to the magnetic sensing module (3), the tool counts with additional sensing systems that can be used at the moment it is required, given that the modular structure of the tool allows it without inconveniences, only it must me added more memory of the same type and a greater quantity of batteries in accordance with the application. These additional sensing systems are used in case it is required a more complete and redundant inspection of the pipe, obtaining not only information corresponding to perforations but also about the general state of the pipe.

In addition, as part of the magnetic sensing module (3) it can be found an ultrasound module, that works with a transmitter and receptor of ultrasonic waves. These waves are emitted all time towards the inner walls of the pipe, which makes the waves bounce and return to the receptor. The receptor has a transducer that allows transforming the acoustic signals to electric ones, to be analyzed in real time by the proper algorithms of the microcontroller of the ultrasound module, and in this way interpret if there exists or not some perforation or defect in the pipe.

In the same way, the magnetic sensing module (3) can comprise a vision module, which works with an infrared camera that allows taking continuous images of the internal section of the pipe where the tool is travelling. These images enter to an internal processor, that, through some algorithms of images treatment previously designed and contained in the microcontrollers, detect the internal state of the pipe. All this information is interpreted and stored in real time, following the operation sequence of the cards previously designed.

The visualization block (4) is the complement of the described tool. After performing an inspection, the tool for the detection of perforations is connected to such visualization media (4), which software instantly communicates with the mentioned tool, through the positioning and main control module (2), specifically through the control card (205). So, all the stored information in the memories contained in such card, is sent to the visualization media (4) to be decoded, organized and visualized. After, the software contained on the mentioned visualization media (4) is in charge of showing the inspection results on a friendly graphic interface and of easy access to any type of personnel. This software is compatible with the type of microcontroller that is found in the control card (205).

From each one of the perforations or defects detected, it is shown in the visualization media (4) the quantity of perforation or defects found, as well as the distance with respect to the starting point, the angular position of the perforation or defect in the transversal section of the pipe, the size of the perforation or defect, the speed of the tool at the moment of the detection and the time in hours, minutes and seconds of the detection moment.

On the preferred mode, the information download time of 1000 perforations between the tool and the visualization media (4) ranges between one and two minutes. Also, the software designed for the acquisition and visualization of the data, that is found in the visualization media (4), also possesses a diagnostics option in which it is presented in real time the functioning of each of the Hall effect sensors of the tool, which allows determining if one of them is failing.

Figure 9:
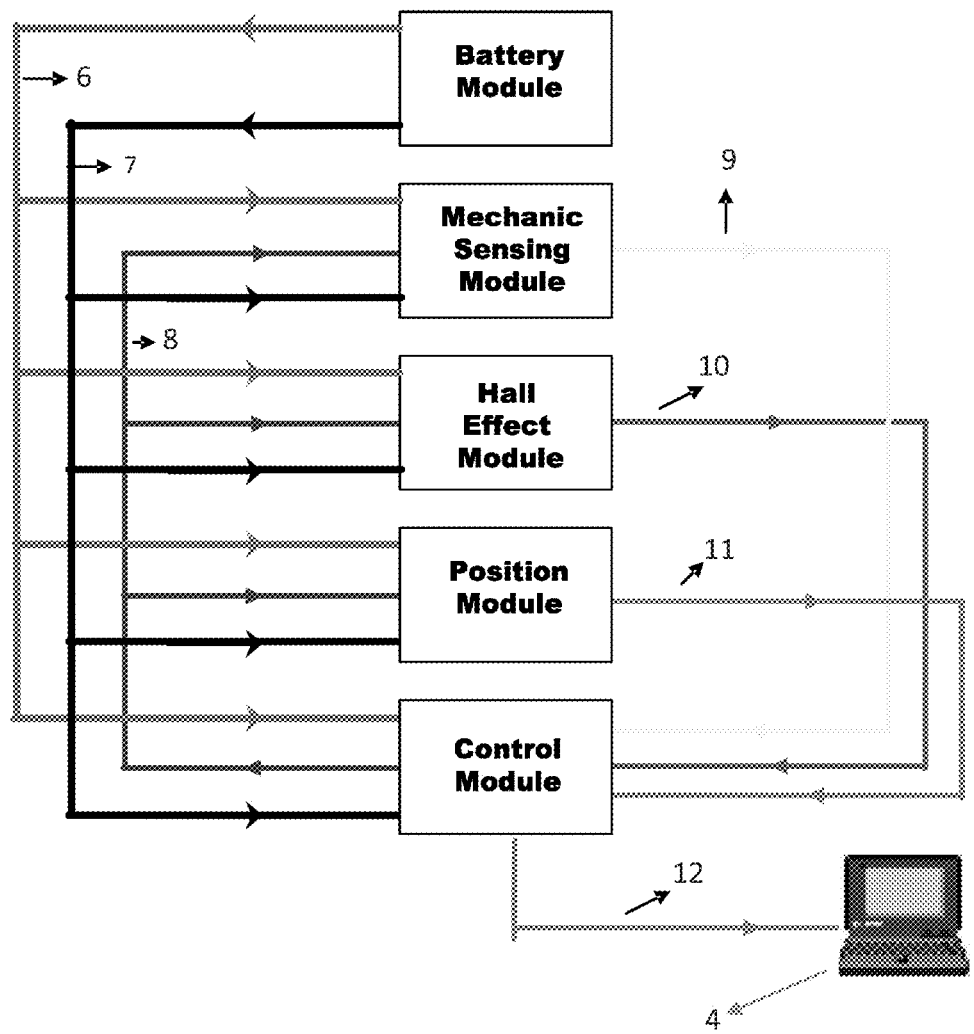
FIG. 9: This figure corresponds to a block diagram of the acquisition and storage process.

Finally, FIG. 9 shows a block diagram of the electronic processing performed by the tool, where there are found each one of the previously described modules and that are a fundamental part of the present invention, as well as the flow of the related processes.

Like this, it can be seen in the mentioned figure the battery module (1), which is connected with each one of the other modules, with the end of providing the necessary energy for the operation of these and is in charge of defining the feed process of the modules (6 and 7).

The positioning and main control module (2) is represented in FIG. 9 as position module and control module, which interact among them through the positioning transmission process (11) and with the other modules through the process of reception of control (8) in the way described previously and as it can be seen through the flow arrows indicated there.

Now, the magnetic sensing module (3) is defined by the mechanic sensing module and the Hall effect module, which are in charge of performing the process of transmission of the mechanical sensor (9) and the process of transmission of Hall effect (10) that are going to be processed by the control module.

Finally, the control module is in charge of the process of data transmission (12), which goes to the visualization media (4) with the purpose of presenting and showing the information obtained from the process of acquisition, analysis, interpretation and filtering, in an easy understanding format for the final user.

Summarizing, the tool of the present invention works under the intervention of the control card (205) which dominates the actions and the information flow from the other electronic cards, meaning, position card (202), odometer card (203) and the commutation and multiplexer card (307), through an interruption mode performed in the microcontroller of each of the cards. Apart from complying with this function, it is in charge of storing the data collected by other cards, given that is provided with the memories.

On the other hand, it is also in charge of establishing a link with the visualization block (4) at the moment of downloading the stored data, or to use one of the different tools contained in the software of acquisition and visualization of the tool.

The information exchange between all the cards is based on a serial asynchronous communication protocol, the same as the communication protocol with the visualization block (4). In this way, the received information by the mentioned control card (205) is processed and classified to decide if it corresponds or not to the characteristics of a perforation. In case of being affirmative, the control card (205) requests information to the position card (202) and the odometry card (203), to afterwards safe all this information in the memory, complying with the main purpose of analyzing this information in real time.

In case the classified information doesn't correspond to the characteristics of a perforation, the next process will indicate if the information corresponds to another parameter detected by the sensors, such as curves or welds, which must not be saved in the memories, but if they must be taken into account for the correct functioning of the tool. This process is repetitive until the tool detects that the line it was inspecting is finished.

EXAMPLES

Example No. 1

The performed test consisted in making an inspection with the tool for the detection of perforations through a pipe of 10 meters long. They were made twenty perforations to this pipe, among which there are thirteen of 6.35 mm (¼"), three of 12.7 mm (½"), three of 19.05 mm (¾") and one of 25.4 mm (1"), with the purpose of testing the functioning of the system, meaning, test if the perforations are detected and the characteristics of each one stored. In the perforations, it was joined through welding, a portion of pipe of 25.4 mm (1") in diameter for all the cases. Also, the purpose of the test comprised the verification of the correct download of the data to the visualization media, in this, a personal computer.

To simulate the dynamic of the fluid, an electric engine was used, which was in charge of the displacement of the tool inside the pipe. The speed of the engine was controlled with an electronic drive, which ensures that the tool moves at a speed of two meters per second at the moment of the test, which is the typical speed of the fluid found in the hydrocarbon pipelines.

In addition, is important to mention that the test was done suppressing the function of the signal conditioner (CAS) in the control card (205).

Characteristics of the Perforations Done on the Pipe

| NUMBER | ANGLE | DISTANCE (meters) | SIZE (mm) |
|---|---|---|---|
| 1 | 0° | 5.06 | 12.7 |
| 2 | 270° | 5.46 | 6.35 |
| 3 | 180° | 5.65 | 2 × 6.35 |
| 4 | 90° | 5.86 | 6.35 |
| 5 | 270° | 6.27 | 6.35 |
| 6 | 90° | 6.48 | 6.35 |
| 7 | 0° | 6.67 | 19.05 |
| 8 | 270° | 7.09 | 12.7 |
| 9 | 90° | 7.27 | 3 × 6.35 |
| 10 | 0° | 7.46 | 6.35 |
| 11 | 180° | 7.67 | 19.05 |
| 12 | 270° | 7.87 | 6.35 |
| 13 | 90° | 8.07 | 6.35 |
| 14 | 0° | 8.27 | 6.35 |
| 15 | 270° | 8.67 | 6.35 |
| 16 | 90° | 8.87 | 12.7 |
| 17 | 0° | 9.07 | 6.35 |
| 18 | 270° | 9.27 | 19.05 |
| 19 | 90° | 9.47 | 3 × 6.35 |
| 20 | 0° | 9.87 | 25.4 |

Test Results

Figure 10:
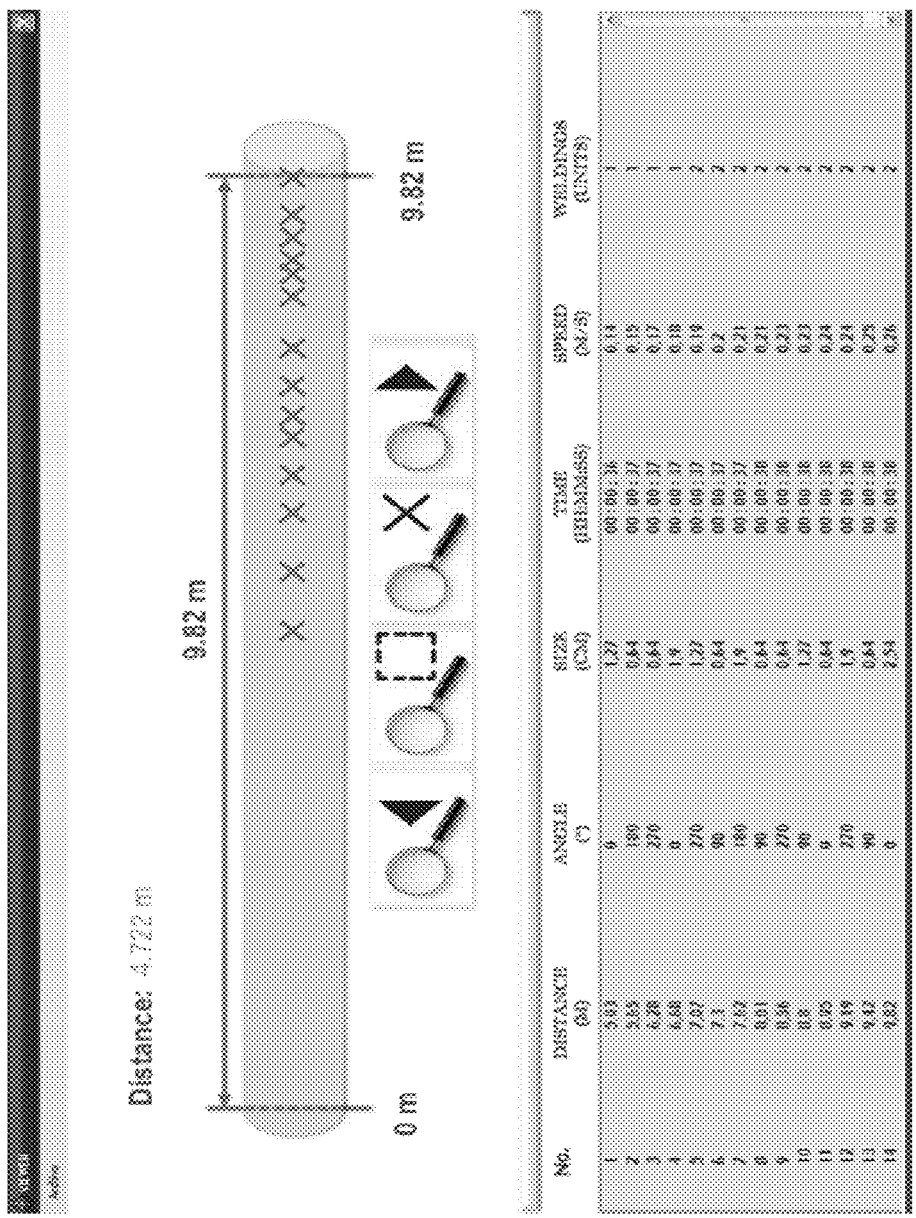
FIG. 10: This figure corresponds to the results obtained with the use of the tool of the present invention and that are described on example 1.

As it can be seen on FIG. 10, the results obtained in the visualizing media software, in this case a personal computer, are the following:

14 of 20 perforations were detected:
  3 of 12.7 mm
  3 of 19.05 mm
  1 of 25.4 mm
  6 of 6.35 mm
They were detected the two welds existing on the 10 meters of pipe
The corresponding data to characteristics of distance, angular location and size, are consequent to the real information of the perforations and present a low percentage of error.
The download of the data to the computer was successful and the downloading time of the information corresponding to the 14 perforations, didn't exceeded the two seconds.
It was confirmed that the realization of the online interpretation is done satisfactorily.

Example No. 2

This test consisted in performing an inspection with the tool for detection of perforations through a pipe of 10 meter in length. To this pipe they were done 24 defects, fourteen of 6.35 mm (¼"), from which two are from threaded nipple and twelve of welded nipple; three of 12.7 mm (½"), two of 19.05 mm (¾") and two of 25.4 mm (1"). Also, there were done two welds and a rectangular hole with the aim of proving the functioning of the system, meaning, prove if perforations and welds are being detected, the storing of the characteristics of each one is performed, and also prove the download of the data to the computer.

To simulate the dynamic of the fluid, an electric engine was used, which is in charge of the displacement of the tool inside the pipe. The speed of the engine is controlled with a drive, which ensures that the tool moves at two meters per second at the moment of the test.

Characteristics of the Perforations on the Pipe

| Defect No. | DESCRIPTION | SIZE (mm) | DISTANCE (m) | ANGLE (°) | DETECTED |
|---|---|---|---|---|---|
| 1 | Welding | — | 3 | — | X |
| 2 | Threaded Nipple Hole | 6.35 | 4.4 | 0 | X |
| 3 | Threaded Nipple Hole | 6.35 | 4.6 | 45 | X |
| 4 | Threaded Nipple Hole | 12.7 | 5 | 0 | X |
| 5 | Threaded Nipple Hole | 6.35 | 5.4 | 270 | X |
| 6 | Threaded Nipple Hole | 6.35 | 5.6 | 180 | X |
| 7 | Threaded Nipple Hole | 6.35 | 5.8 | 90 | X |
| 8 | Threaded Nipple Hole | 6.35 | 6.2 | 270 | |
| 9 | Threaded Nipple Hole | 6.35 | 6.4 | 90 | X |
| 10 | Threaded Nipple Hole | 19.05 | 6.6 | 0 | X |
| 11 | Welding | — | 7 | — | X |
| 12 | Threaded Nipple Hole | 12.7 | 7.1 | 270 | X |
| 13 | Threaded Nipple Hole | 6.35 × 3 | 7.2 | 90 | X |
| 14 | Threaded Nipple Hole | 25.4 | 7.6 | 180 | X |
| 15 | Threaded Nipple Hole | 6.35 | 7.8 | 270 | X |
| 16 | Threaded Nipple Hole | 6.35 | 8 | 90 | X |
| 17 | Threaded Nipple Hole | 6.35 | 8.2 | 0 | |
| 18 | Threaded Nipple Hole | 6.35 | 8.6 | 270 | X |
| 19 | Threaded Nipple Hole | 12.7 | 8.8 | 90 | X |
| 20 | Threaded Nipple Hole | 6.35 | 9 | 0 | X |
| 21 | Threaded Nipple Hole | 19.05 | 9.2 | 270 | X |
| 22 | Threaded Nipple Hole | 3 × 6.35 | 9.4 | 90 | X |
| 23 | Threaded Nipple Hole | 25.4 | 9.8 | 0 | X |
| 24 | Rectangular Hole | 5 × 10 | 9.9 | 90 | X |

Test Results 22 of 24 perforations were detected:
  3 of 12.7 mm (½")
  2 of 19.05 mm (¾")
  2 of 25.4 mm (1")
  12 of 6.35 mm (¼")
  Rectangular Hole of 5×10 mm
The two existing welds on the 10 meters of pipe were detected.
The data corresponding to the distance, angular location and size characteristics is consequent with the real information of the perforations and present a low percentage of error.
The data download to the computer was successful, and the downloading time of the information corresponding to the 22 perforations didn't exceeded the two seconds.
It was confirmed that the online interpretation was being done satisfactorily.

The invention claimed is:

1. A tool for the detection of perforations and interpretation of data online, comprising a battery module, a positioning and main control module that performs the analysis, interpretation and filtering of the information online, and a magnetic sensing module that performs the acquisition of primary information from the pipes perforations or defects,
   wherein the positioning and main control module is divided in two sections, a first section for the acquisition of positioning data and a second section for supporting the main controller;
   wherein the first section comprises at least three odometers constituted by a wheel that is in contact with an internal pipe wall during a whole trajectory, and
   wherein two magnets are imbedded in the wheel and located on opposite sides of the same face of the wheel.

2. The tool, according to claim 1, wherein the magnetic sensing module comprises permanent magnets and Hall effect sensors, the permanent magnets configured to generate a magnetic field and located radially in a sensing crown in a manner that a north pole of each permanent magnet is confronted with a posterior face of the Hall effect sensors.

3. The tool, according to claim 2, wherein the Hall effect sensors of the magnetic sensing module are placed radially at a distance between 1 and 3 millimeters from the internal wall of the pipe.

4. The tool according to claim 2, wherein the magnets used in the magnetic sensing module can be ceramic, of Alnico or rare earths.

5. The tool according to claim 4, wherein the magnets are preferably selected made of rare earths with a field density of 100 mWb to 200 mWb (10,000 and 20,000 Gauss).

6. The tool according to claim 5, wherein the magnets are selected from a group consisting of Samarium, Cobalt, Boron or Neodymium.

7. The tool according to claim 6, wherein the magnets of Neodymium.

8. The tool according to claim 2, wherein the sensing crown is composed by six crown sections, where the Hall effect sensors are located.

9. The tool according to claim 8, wherein the sensing crown comprises a quantity between 30 and 70 sensors.

10. The tool according to claim 9, wherein the sensing crown comprises preferably between 40 and 60 sensors.

11. The tool according to claim 8, wherein the sensing crown is elaborated in polyurethane, polypropylene or mixtures of these.

12. The tool according to claim 2, wherein the magnetic sensing module comprises at least four cards in master-slave configuration.

13. The tool according to claim 12, wherein the slave cards are multiplexer cards that are in charge of managing the information coming from the Hall effect sensors, wherein the Hall effect sensors are divided into a plurality of groups in equal number, and wherein each multiplexer card is assigned to each of the plurality of groups.

14. The tool according to claim 12, wherein the slave cards are three multiplexer cards that execute algorithms that allow knowing in real time the information of the perforations or defects of the pipe.

15. The tool according to claim 12, wherein each slave card comprises a microcontroller, a multiplexer, and a signal conditioner, the signal conditioner being arranged between the multiplexer and the microcontroller.

16. The tool according to claim 12, wherein the at least four cards include a commutation and multiplexer card acting as a master and being in charge of controlling and syncing the slave cards.

17. The tool according to claim 12, wherein the cards comprise a microcontroller of 8, 16 or more Bits, and a data memory no less than 256×8 bytes.

18. The tool according to claim 17, wherein the microcontroller of 8,16 or more bits has a serial transmission module, an analogue/digital convertor and the ICSP (In-Circuit) programming capacity.

19. The tool according to claim 12, wherein the magnetic sensing module comprises preferably four cards, one is the master and three which are slaves, which are in charge of managing the information of 48 Hall effect sensors distributed in groups of 16 sensors per card.

20. The tool according to claim 1, wherein the wheel is constructed in a wear resistant material but with a high friction coefficient, selected from Teflon, Viton, polyurethane or mixtures of these.

21. The claim according to claim 1, wherein the module also comprises an odometry card, that comprises at least two accelerometers that measure the angular position of each perforation or defect detected.

22. The tool according to claim 21, wherein the odometry card comprises also a microcontroller that has at least three analogue/digital convertors.

23. The tool according to claim 1, wherein the positioning and main control module also comprises in the positioning data acquisition section, a position card that has a microcontroller and a real time clock.

24. The tool according to claim 1, wherein the positioning and main control module has an internal wiring and an extra battery package.

25. The tool according to claim 1, wherein the positioning and main controller module comprises a control card that has information storage memories.

26. The tool according to claim 25, wherein the information storage memories are selected from the group consisting of EEPROM, RAM, FLASH and ROM.

27. The tools according to claim 26, wherein the information storage memories have a storage capacity between 128 and 2048 Kbits.

28. The tool according to claim 27, wherein the information storage memories have a storage capacity preferably between 256 and 1024 Kbits.

29. The tool according to claim 1, wherein the battery module comprises a battery package, internal wiring, an exterior connector and some capacitor filters.

30. The tool according to claim 29, wherein the capacitor filters are found in the range between 1 mF and 100 mF.

31. The tool according to claim 29, wherein batteries of the battery package have a current between 2,500 mA/h and 5000 mA/h and a voltage between 1.2 v and 5 v, to create a total package between 9.5v and 12v at a current between 18,000 mA/h and 22,000 mA/h.

32. A tool for the detection of perforations and interpretation of data online, comprising a battery module, a positioning and main control module that performs the analysis, interpretation and filtering of the information online, and a magnetic sensing module that performs the acquisition of primary information from the pipes perforations or defects,
   wherein the external structure of each one of the modules is constituted by two support discs and a metallic body which is a hollow metallic tube, interconnected through homokinetic joints through which all the communication wiring passes internally between the different modules.

33. The tool according to claim 32, wherein each one of the modules comprises external contacts to earth that land during the trajectory and eliminates all possible static energy that it may acquire.

34. The tool according to claim 33, wherein each one of the modules comprise also input and output valves to inject or evacuate nitrogen or some inert gas that displaces the air inside the module, to create an inert environment and with a greater security condition in the tool.

35. The tool according to claim 1, wherein the magnetic sensing module optionally comprises an ultrasound module and a vision module.

36. The tool according to claim 35, wherein the ultrasound module has a transmitter and a receptor of ultrasonic waves; and the vision module has an infrared camera.

37. The tool according to claim 1, wherein the tool connects to a visualization block through a control card to transmit the information obtained during its trajectory through the pipe, where the software contained on said visualization media decodes, organizes and visualizes the inspection results.

* * * * *